Sept. 29, 1970    E. B. TICKELL ET AL    3,531,761
DEPTH CONTROLLERS FOR SEISMIC STREAMER CABLES
Filed Dec. 26, 1968    2 Sheets-Sheet 1
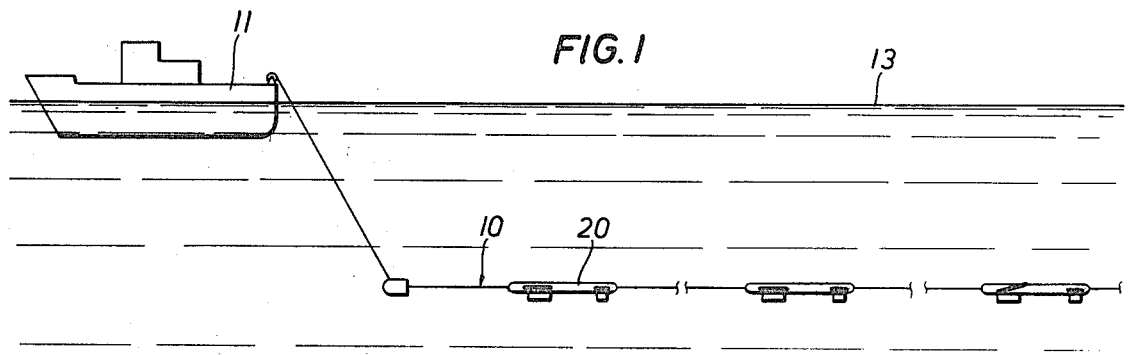
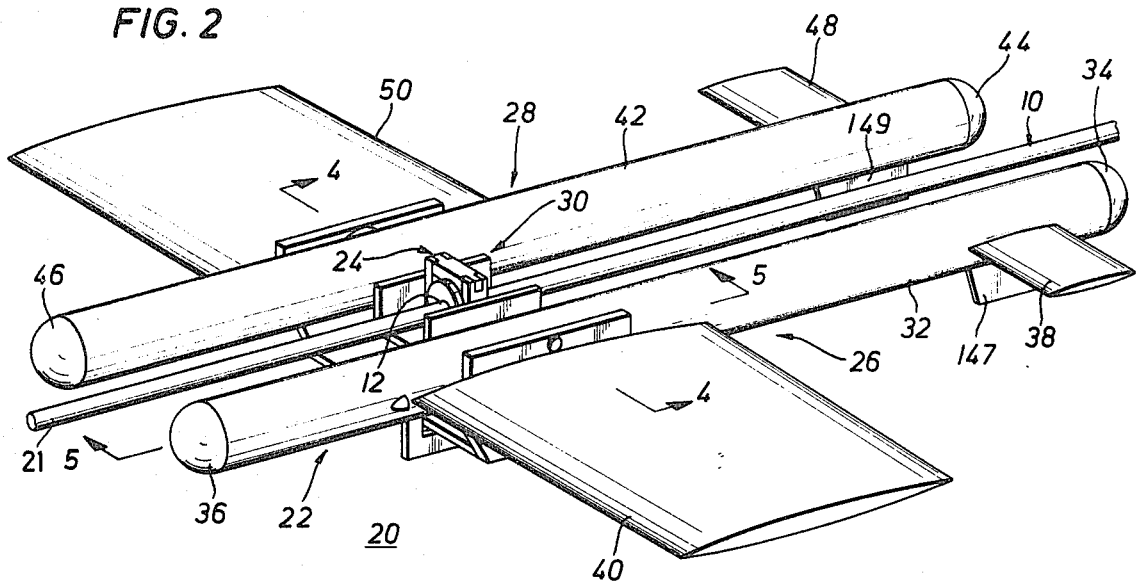
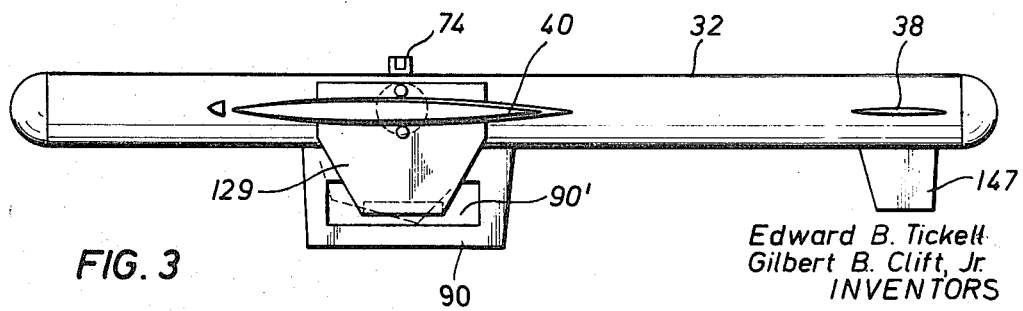
Edward B. Tickell
Gilbert B. Clift, Jr.
INVENTORS
BY Michael P. Breston
ATTORNEY

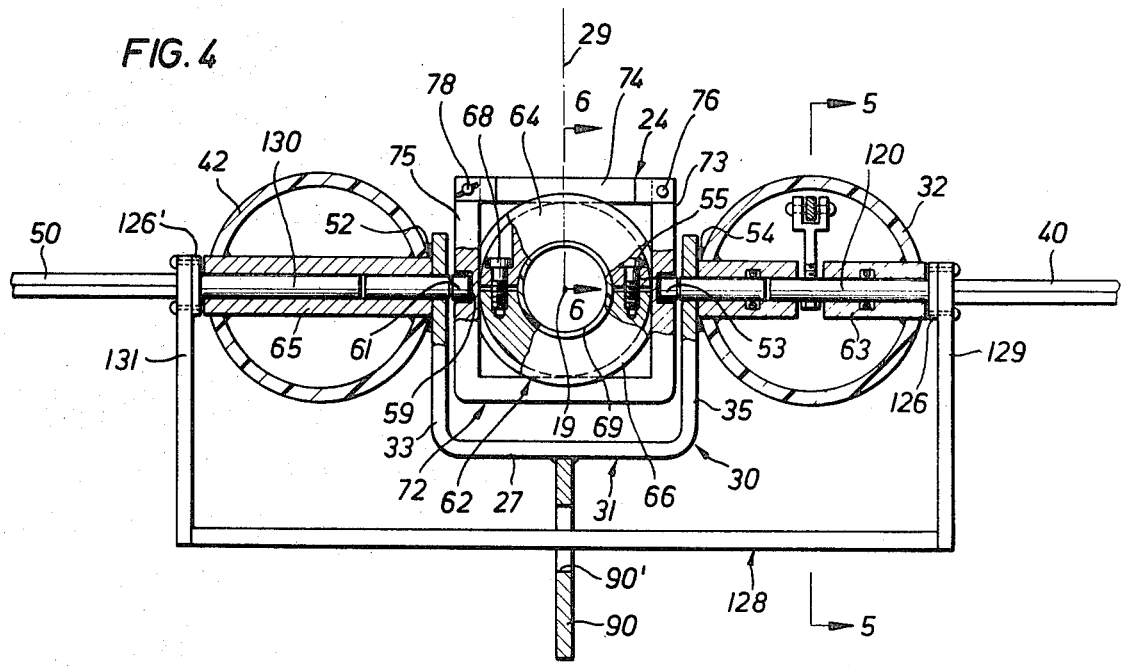
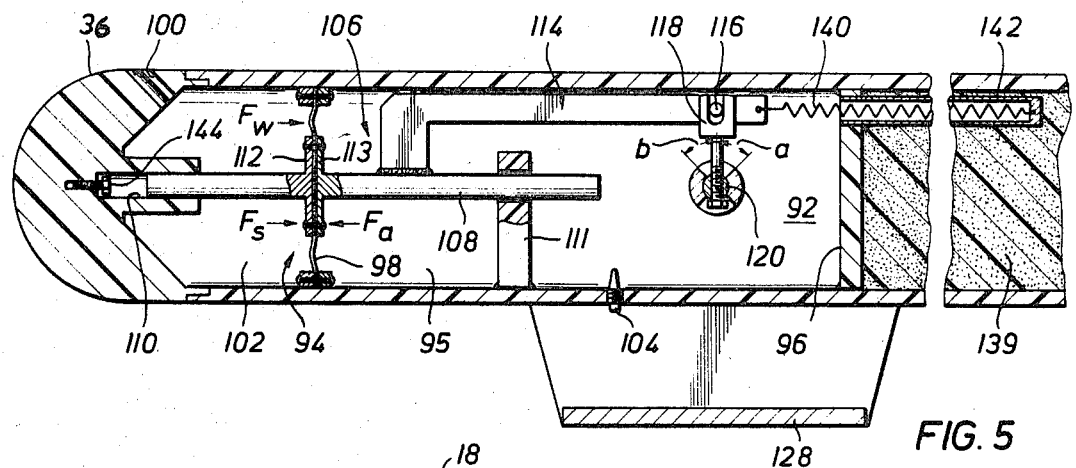
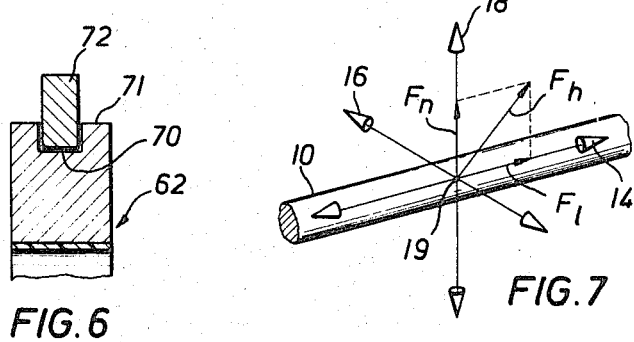

3,531,761
DEPTH CONTROLLERS FOR SEISMIC
STREAMER CABLES
Edward B. Tickell and Gilbert B. Clift, Jr., Houston, Tex.,
  assignors, by mesne assignments, to Numak, Inc., a
  corporation of Texas
    Filed Dec. 26, 1968, Ser. No. 787,084
    Int. Cl. G01v 1/38; B63b 21/56
U.S. Cl. 340—7                                    11 Claims

ABSTRACT OF THE DISCLOSURE

This invention relates to apparatus for marine seismic surveying and includes a plurality of depth controllers, each suspended from a section of the towed seismic streamer cable for maintaining the cable within predetermined depth levels. The suspension permits the cable and the frame of the depth controller to freely rotate relative to each other and to swing relative to each other in a limited arc. Depth regulating means on the frame effectively maintain the controller within predetermined water depth levels.

BACKGROUND OF THE INVENTION

The art of marine surveying by the use of seismic waves has recently achieved very considerable importance and various methods and apparatus for conducting marine seismic surveying operations are well known to the art. A considerable amount of such work has been conducted in relatively shallow water in coastal regions. In conducting seismic surveying operations in such shallow water, for instance up to 15 or 20 feet in depth, it has been the practice to lower the streamer cable nearly to the floor of the body of water or to maintain it by suitable surface floats. However, this technique is not entirely satisfactory for operations conducted in relatively deep waters, say at levels between 25 and 100 feet. In these relatively deep water seismic operations it becomes troublesome and time consuming to suspend the cable from surface floats and to attach suitable weights to the cable as is common practice in the art.

The seismic wave energy reflected upwardly by subsurface formations is received at several detector stations in the streamer cable, converted into electrical energy, and suitably recorded. Care must be exercised to avoid errors in subsequent computations resulting from excessive variations in the depth levels of the various detectors housed by the streamer cable.

As would be expected, the wave action on the above-mentioned depth controllers may tend to increase the noise level often to such an extent that the noise-to-signal ratio may exceed acceptable limits. The problem presented by relatively high noise-to-signal ratios is especially severe in seismic operations conducted at a considerable distance from shore, since higher noise levels may require larger or a greater number of energy sources, the handling of which in rough waters or weather is time consuming, difficult and sometimes dangerous.

More recently seismic cable depth controllers have been proposed and used which are less time consuming to couple to the cable, and which do not require surface supports. It was found however, among other things, that in field use these recent controllers were relatively fragile and their moving parts which were continuously exposed to salt water, became either corroded or subject to frequent operational failures. These recent depth controllers were only free to roll about the cable, consequently they frequently bent the cable in a vertical plane when subjected to cross-current water waves which produced pitching moments about their center of gravity. Moreover, these recent depth controllers were fastened in series to the cable and cast overboard with the cable and it frequently happened that at least one depth controller would roll over several times and would reach the water surface bottom-side-up. When that happened the operator had to reel in at least a portion of the streamer cable while decoupling the depth controllers between the vessel and the controller whose attitude was defective, correct its attitude, and recouple the depth controllers as the cable was again payed out.

By way of summary it can be generally stated that among other things prior art depth controllers were found: to introduce spurious electric noises into the detectors of the streamer cable, to be relatively large and cumbersome to manipulate, to be relatively expensive to manufacture, to be relatively fragile in field use, to cause the cable to bend or twist, to cause the cable to sink under certain adverse conditions, to offer appreciable drag, to create considerable turbulence in the water flow around the cable, and to be relatively unstable under varying field conditions.

SUMMARY OF THE INVENTION

The present invention contemplates broadly new and improved depth controllers which can be loosely suspended from and attached to seismic streamer cables. The suspension permits free rotation about a roll axis and limited rotation about a pitch axis, thereby significantly reducing the moments and forces acting on the cable and their tendency to develop noise.

An illustrative preferred embodiment of this invention comprises a frame having two longitudinal subassemblies, positioned on opposite lateral sides of the cable, and maintained relative to each other by a lateral support sub-asssembly. Depth control means which may include fixed and movable laterally extending surfaces are symmetrically attached to the frame. The movable surfaces are movable from a maximum descending angular position to a maximum ascending angular position in dependance on the depth of the controller in the water. A suitable suspension couples the controller's frame to the cable in a manner which permits the cable and the frame to be susceptible of having relative free roll and limited pitch, i.e., to rotate freely relative to each other about a longitudinal roll axis and to swing relative to each other in a limited arc about a lateral pitch axis.

It is a broad object of this invention to provide improved means for placing and maintaining in water seismic streamer cables at predetermined depth levels.

A further object of this invention is to achieve effective reduction of noise by efficiently submerging and maintaining streamer cables at predetermined water depth levels.

Other objects of this invention aim at providing new and improved seismic cable depth controllers which: are relatively inexpensive to manufacture; and relatively easy to secure to the cable; are compact, lightweight and dynamically stable; have a low self-generated noise characteristic; maintain the suspended portion of the cable in a substantially horizontal attitude over a relatively wide range of towing speeds; and are relatively unresponsive to extraneous cross-currents and wave motions.

Other objects and advantages of this invention will become apparent from the following desrciption, when taken in connection with the accompanying drawings in which:

FIG. 1 shows schematically a towed streamer cable coupled to the depth controllers and maintained at a predetermined depth;

FIG. 2 is a view in perspective of the controller of FIG. 1;

FIG. 3 is a side elevation view of the controller of FIG. 2;

FIG. 4 is a sectional view of the controller taken in FIG. 2 along line 4—4, and FIG. 4A is a view of the pivot shaft ends;

FIG. 5 is an elevational view partly in cross-section of the drive mechanism for rotating the control surfaces in the controller of FIG. 2;

FIG. 6 is a view in cross-section of the coupling suspension on line 6—6 in FIG. 4; and FIG. 7 shows the forces acting on the segment of the cable supporting the controller.

In the drawings similar reference characters denote corresponding parts throughout the several views.

Referring to FIGS. 1 and 7, a plurality of depth controllers generally designated as 20 are attached in series to a streamer cable 10 which houses arrays of detectors (not shown) for receiving reflected seismic signals. Cable 10 is towed under tension by a carrier or boat 11 in a direction substantially parallel to the surface 13 of the body of water undergoing seismic investigations. Seismic streamer cables per se are described, for example, in U.S. Pats. Nos. 2,465,696 and 3,299,397. A seismic streamer cable 10 is relatively very long. However the motion of any segment 12 of cable 10 to which a depth controller 20 is attached can be described in space geometry in relation to the segment's longitudinal axis 14, lateral axis 16 and normal axis 18, all intersecting at a center 19, hereinafter called "the center of attachment."

Typically cable 10 is made of an outer flexible tubular housing or jacket 21 containing arrays of hydrophones, reinforcing rods, pressure gauges, and other like transducers (not shown) and is filled with a suitable fluid. Since jacket 21 is flexible and pressure responsive, any depth controller coupled to the cable should impose a minimum load on the cable. Moreover, hydrodynamic forces F acting on the segment 12 should be limited to and pass through the center of attachment 19 and should have a vertical (lift) component $+F_n$ (or $-F_n$) on the normal axis 18, and a longitudinal component $F_L$ on the longitudinal axis 14 (the normal buoyancy and gravity forces are not shown).

Referring now to the remaining figures, the depth controller 20 has a streamlined frame, generally designated as 22, supoprting a suspension 24 for maintaining segment 12 of towed cable 10 within a predetermined depth range in the body of water.

Frame 22 includes two longitudinal sub-assemblies 26, 28, symmetrically disposed on either side of cable 10, parallel to a vertical plane embracing axes 14 and 18, and supported by a lateral support sub-assembly 30 bridging the longitudinal sub-assemblies 26, 28 below segment 12. Frame 22 can be made of suitable rigid, non-corrosive materials such as stainless steel alloys, plastic, wood or combinations thereof. For ease of construction from conventional parts, sub-assembly 26 is made of an elongated tubular member 32 having streamlined tail and front end plugs 34, 36 respectively. Extending outwardly and laterally from, and fixedly secured to or forming integral part with, the rear end of tube 32 is a surface 38 and extending outwardly and laterally from the front end of tube 32 is a movable control surface 40. Sub-assembly 28 similarly, and symmetrically relative to a vertical plane 29 passing through the center of attachment 19, includes a tubular member 42, end plugs 44, 46, surface 48 fixedly secured to the rear of tube 42 and control surface 50 movably and forwardly attached relative to tube 42.

The lateral support sub-assembly 30 includes preferably a U-shaped bracket 31 for added rigidity. Tube 42 is fixedly secured to one leg 33 and tube 32 is fixedly secured to the other leg 35 of bracket 31, as by welding or gluing at 52, 54 respectively.

To allow cable 10 to have bi-directional freedom of movement relative to frame 22, the suspension 24 is provided with a coupling member 62 fixedly secured to and extending longitudinally on the outer jacket 21 at the desired segment of attachment 12 on cable 10. Coupling 62 may be made conveniently of two semi-cylindrical portions 64, 66 rigidly fastened to each other and to the outer surface of jacket 21 by screws 68. To reinforce the strength of the wall of segment 12 there is positioned inside of tubular jacket 21 and immediately opposite to coupling 62 a rigid reinforcing sleeve 69. Forces between suspension 24 and cable 10 can therefore be transmitted to each other through coupling 62 and sleeve 69. The outer wall 71 of coupling 62 is provided with a circumferential groove 70 having a substantially rectangular cross-section adapted to loosely receive and support a releasable yoke member 72, which could be of annular but preferably of rectangular configuration, making contact with groove 70 over a limited area on each of its four inner walls, thereby providing a "four-point" suspension of cable 10.

To allow cable 10 to swing or pitch in a limited arc relative to frame 22, that is to allow cable 10 to rotate about a lateral axis, preferably passing through the center of attachment 19, such as axis 16, yoke 72 is rotatably mounted on two laterally extending pivot shafts. Vertical leg 73 of yoke 72 rotatably receives one end of a pivot shaft 53 in a bore 55. A diametrically opposed bore 59 in a vertical leg 75 of yoke 72 receives one end of a pivot shaft 61. Shaft 53 extends through a hole in leg 35 of bracket 31 into a sleeve bearing 63 positioned inside tube 32 along a lateral diameter, as shown. Similarly shaft 61 extends through leg 33 into a sleeve bearing 65 positioned inside tube 42 along a lateral diameter. Shafts 53 and 61 are biased against yoke 72 by shafts 120, 130, respectively. Shafts 120, 130 have enlarged end heads 126, 126', respectively. Since yoke 72 also serves as a detachable coupling device between cable 10 and frame 22, its upper lateral leg 74 is pivotally mounted to conveniently serve as a locking latch. Thus latch 74 is pivotally mounted on leg 73 by a pivot 76 and is releasably secured to leg 75 by a securing device 78, which in its simplest form may include a bolt and wing nut.

Rotation of cable 10 about the lateral axis 16 passing through the longitudinal axes of shafts 53, 61 is limited by the horizontal leg 27 of the laterally extending bracket 31 or by other suitable limiting means. In one embodiment the cable was allowed to swing about an arc sustained by an angle of about 30°, as will be more fully explained hereafter. Thus suspension 24 effectively permits free rotation between cable 10 and frame 22 about the longitudinal axis 14 and limited rotation abort the lateral axis 16, while preventing linear movement therebetween by the engagement of yoke 72 inside groove 70. A suitable counterweight, which may be in the form of a keel 90, is secured to the center of leg 27 of bracket 31, extending longitudinally below the center of attachment 19 to furnish frame 22 with the necessary horizontal and vertical stability.

To allow cable 10 to free itself from controller 20, slits 86, 87 (FIG. 4A) are provided in shafts 53, 61, respectively. Thus when an impact force hits controller 20, the cable 10 together with yoke 72 would become free of frame 22. Cable 10 would then be allowed to float to the water surface 13. It will be apparent that instead of reducing the diameter of pivot shafts 53, 61, the thickness of the walls of yoke 72 could be appropriately reduced to cause the yoke to split in half under certain undesirable conditions, thereby freeing cable 10.

To allow control surfaces 40 and 50 to rotate in unison in response to a control signal which could be applied from vessel 11, or in response to a pressure or depth variation from a predetermined depth level, there is provided inside tube 32 a motor assembly generally designated as 92. The motor assembly 92 may include a pressure transducer 94 adapted to change a pressure variation from a balanced condition to an angular displacement of a shaft from a reference angular position. The transducer has an air chamber 95 defined by the cylindrical inner wall of a section or of the entire tube 32, by a cylindrical end wall 96 and by a flexible end wall or diaphragm 98 positioned near the end plug 34. Plug 34 has a plurality of channels or ports 100 for admitting external water pressure into a chamber 102 facing diaphragm 98. Air is admitted inside air chamber 95 by an air valve 104 which may be a standard tire tube valve. To translate the linear displacement of diaphragm 98, in response to a pressure difference across its walls, into a shaft rotation, there is provided a translating mechanism generally designated as 106, which includes: a rod 108, one end of which slidably engages a bore 110 in the center body of plug 34, and the other end is slidably supported by a support member 111 secured to the inner wall of tube 32. To strengthen diaphragm 98 two stiff center plates 112, 113 are provided on both faces of the diaphragm as shown.

Suitable fastening means such as screws or bolts secure the various parts together in an air-tight fashion, as shown. Either fixedly or pivotally secured to rod 108 is an L-shaped bracket 114, the free end of which carries a pivot 116 positioned inside an engaging yoke of a pivot arm 118 fixedly mounted on shaft 120. Shaft 120 rotates in the sleeve bearing 63 in abutting engagement against pivot 53. The external end of shaft 120 has, as previously stated, an enlarged head 126 to which is secured one end 129 of a movable yoke or bracket 128. The other end 131 of bracket 128 is secured to the enlarged head 126' of shaft 130 rotatably supported by the sleeve bearing 65 inside tube 42. The symmetrical arrangement of the parts and the axial alignment of shafts 53, 120, 61 and 130 relative to the vertical plane 29 and the longitudinal axis 14 of cable 10 will be evident from the drawings.

Control surfaces 40 and 50 are fixedly secured to the ends 129, 131 of yoke 128, respectively, and have a horizontal attitude under balanced or equilibrium conditions in the water at the predetermined depth. A long spring 140, having one end attached to bracket 114 and the other end to the end wall of an anchor tube 142, supported by wall 96, rotates shaft 120 clockwise, as viewed in FIG. 5, by a maximum allowed bias angle $a$. When air is applied to the air chamber 95 the air pressure exerts an outward force $F_a$ against the diaphragm 98 tending to push rod 108 outwardly against an adjustable limit stop 144 inside bore 110. The maximum outward rectilinear movement of rod 108 rotates shaft 120 by a maximum counter-clockwise angle $b$ with respect to a transverse plane passing through the longitudinal axis of shaft 120. Tail keels 147 and 149 (FIG. 2) are provided on tubes 32, 42, respectively. Keel 90 serves to protect movable bracket 128, which passes through a suitable opening 90' and to form a tripod together with keels 147, 149 for resting frame 22.

The inner volumes of tubes 32 not occupied by the air chamber 95 and that of tube 42 may be filled with a lightweight Styrofoam material 139 to maintain the frame 22 positively buoyant in case water should enter the inner volumes of tubes 32, 42.

It will be appreciated that the movable bracket 128 could be driven by an electric motor driving for example, a worm engaging a worm gear which could be secured to shaft 120. The electric power required to drive the motor could be supplied from a local battery housed in tube 32 or from power supplied by boat 11.

In operation, before each controller 20 is coupled to a segment 12 of cable 10, the air pressure in chamber 95 is adjusted for the desired operating depth level. A suitable calibration chart is usually obtained experimentally to allow the operator to choose the desired air pressure. Of primary interest here are essentially three forces acting on the diaphragm 98: The outward force $F_a$ resulting from the air pressure being exerted on the surface area of the inner wall of the diaphragm, the inward force $F_s$ exerted by the spring 140, and the inward force exerted by the water pressure $F_w$ against the outer wall of the diaphragm.

At equilibrium, $$F_w + F_s = F_a \qquad \text{Equation 1}$$

then controller 20 is at the predetermined depth level. Before the controller is positioned in water, the force $F_a$ being greater than the force $F_s$, causes rod 108 to assume its maximum linear displacement which is limited by the stop 144. The surfaces 40 and 50 then have a descending attitude, that is, they are inclined forwardly and rearwardly with respect to the longitudinal axis 14.

As the streamer cable 10 is payed out from the vessel 11, the depth controllers 20 are secured to their assigned segments 12 by locking latch 74 with the securing device 78. It will be appreciated that the coupling of a controller 20 to a segment 12 can be done almost in a matter of seconds. If cable 10 were not moving, the buoyancy of controller 20 would allow it to float substantially horizontally and nearly completely submerged. The buoyancy of the sub-assemblies 26, 28 can be adjusted by adding suitable weights to the keels 90, 147 and 149, or to the inner volumes of tubes 32, 42. As soon as each depth controller becomes waterborne, a hydrodynamic force $F_h$ becomes developed in each of surfaces 38 and 48 as a result of the forward velocity of cable 10. $F_h$ varies with the angle of attack of surfaces 40 and 50 as well known to those skilled in the art. The angle of attack preferably should not exceed 15° with respect to the horizontal. Force $F_h$ remains substantially normal to surfaces 40 and 50. The vertical components $F_n$ of these hydrodynamic forces $F_h$ cause the depth controller 20 to dive until it reaches a level wherein Equation 1 holds true. When that happens diaphragm 98 assumes its neutral or rest position, movable surfaces 40, 50 assume a horizontal attitude.

Should cable 10 fall below this predetermined level, the water pressure in chamber 102 will cause the diaphragm 98 to move inwardly, surfaces 40 and 50 to incline forwardly and upwardly, and the depth controller will pitch positively until the predetermined level is re-established. Similarly should cable 10 rise above the predetermined level the diaphragm 98 will move outwardly by an amount corresponding to the pressure variation between the predetermined level and the new level causing the depth controller to pitch negatively until the predetermined level is again re-established.

While analytical expressions for determining the various physical parameters necessary to build the depth controller may be derived, the experimental method was found to be more desirable if not more dependable. Among the factors of interest are: the tension in the cable, the controller's inertia moment, the buoyant force, the lift force which depends on the area of movable surfaces 40 and 50, the maximum allowed pitch angle, the drag force, and the velocity of tow.

To prevent the depth controller from pitching and rolling under operating conditions at the predetermined level of operation, it is desired that the forces developed by buoyance, gravity, drag, and hydrodynamic effects act on the longitudinal axis 14 of the cable 10, which is also the longitudinal axis of symmetry of the elongated frame 22, through the center of attachment 19, or a normal plane containing the lateral axis of pivots 53 and 61.

Since the coupling between the cable and the depth controller allows relative rotation and inclination, under operating conditions unbalanced forces may cause the depth controller to pitch about the common axis of shafts 120 and 130. The fixed surfaces 38 and 48 together with the surfaces of the tail ends of tubes 32 and 42 will automatically develop stabilizing restoring moments having a direction and amplitude sufficient to maintain frame 22 substantially horizontal. The relative contributions of the tubes and the fixed surfaces 38, 48 will depend on their respective, effective surface areas.

It will be appreciated that while only one motor driving mechanism 92 is provided in tube 32 another such motor may be provided in tube 42 for driving shaft 130. The two motors would then be carefully calibrated to cause movable surfaces 40 and 50 to rotate in substantial synchronism, even without bracket 128.

It will be apparent that other driving mechanisms could be employed for suitably driving shafts 120 and 130 in response to a condition or signal. Therefore, various other modifications will readily suggest themselves to those skilled in the art without departing from the scope of this invention as defined in the appended claims.

What we claim is:

1. A depth control system for controlling the depth at which at least one section of a long seismic streamer cable is towed in a body of water, said system comprising:
   a frame extending laterally on either side of said cable;
   movable coupling means including yoke means for loosely coupling said frame to said section,
   whereby said cable is allowed to swing relative to said frame in a vertical plane extending lengthwise of said cable about a lateral pitch axis;
   at least one surface movably mounted on said frame;
   depth control means coupled to said surface for moving said surface in response to a condition to thereby develop hydrodynamic forces on said surface,
       said forces causing said section to change its position relative to the surface of said body of water; and
       said frame providing a hydrodynamic restoring effect against any unbalanced forces tending to swing said frame relative to said cable.

2. The depth control system of claim 1 wherein said yoke means is divisible along its length to removably secure said frame to said section.

3. The depth controller of claim 1 wherein said frame has at least one weak member adapted to free said frame from said cable under predetermined operating conditions.

4. The depth control system of claim 1 and further including at least another surface movably mounted on said frame,
   said movable surfaces being mounted on respective coaxial shafts journaled normal to said plane, and
   the axes of said shafts being substantially in alignment with said pitch axis.

5. The depth control system of claim 4 wherein said shafts are driven in synchronism by said depth control means.

6. The depth control system of claim 1 wherein said frame further includes a pair of fixed surfaces extending laterally and symmetrically on both sides of said cable for providing said restoring effect.

7. The depth control system of claim 6 wherein:
   said frame further includes two longitudinal tubular members each having a streamlined configuration,
   said depth control means includes at least one pressure transducer to convert a change in water pressure into a force for moving said movable surface, and
   said pressure transducer including an air chamber having a movable wall responsive both to the pressure exerted by the air in said chamber and to the external water pressure at the depth at which said section is being towed.

8. The depth control system of claim 7 and further including:
   a lateral member fixedly maintaining said longitudinal members, and
   stabilizing means connected to said lateral member for providing said frame with horizontal stability.

9. The system of claim 1 and further including force transfer means coupled to said surface for transferring said forces from said surface to said yoke means.

10. The depth control system of claim 9 wherein said force transfer means include,
    at least one pivot shaft journaled to said frame and having a pivot axis substantially normal to said plane, and
    said pivot axis being substantially in alignment with said pitch axis.

11. The depth control system of claim 9 wherein said coupling means includes a cylindrical bearing to rotatably support said yoke means and to secure said frame onto said section against movement of said frame along said cable.

References Cited

UNITED STATES PATENTS

| 3,372,666 | 3/1968 | Baker | 340—7 X |
| 3,375,800 | 4/1968 | Cole et al. | 340—7 X |

RODNEY D. BENNETT, JR., Primary Examiner

D. C. KAUFMAN, Assistant Examiner

U.S. Cl. X.R.

114—235